(12) United States Patent
Cancel

(10) Patent No.: US 7,480,587 B2
(45) Date of Patent: Jan. 20, 2009

(54) METHOD FOR ADAPTIVE PERFORMANCE MARGINING WITH THERMAL FEEDBACK

(75) Inventor: Ramon C. Cancel, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 32 days.

(21) Appl. No.: 10/882,547

(22) Filed: Jun. 30, 2004

(65) Prior Publication Data

US 2006/0004538 A1    Jan. 5, 2006

(51) Int. Cl.
*G01K 1/08* (2006.01)
(52) U.S. Cl. ............................................. 702/132
(58) Field of Classification Search ............... 702/136, 702/130, 142, 81, 132, 135; 713/322, 300; 374/10, 11, 100, 103, 120, 145, 163; 165/127; 716/1
See application file for complete search history.

(56) References Cited

U.S. PATENT DOCUMENTS

| | | | | |
|---|---|---|---|---|
| 6,067,508 A | * | 5/2000 | Conn, Jr. | ............. 702/132 |
| 6,092,926 A | * | 7/2000 | Still et al. | ............. 374/141 |
| 6,321,175 B1 | * | 11/2001 | Nagaraj | ............. 702/132 |
| 6,470,289 B1 | * | 10/2002 | Peters et al. | ............. 702/132 |
| 6,622,250 B1 | * | 9/2003 | Castillo et al. | ............. 713/300 |
| 6,718,474 B1 | * | 4/2004 | Somers et al. | ............. 713/322 |
| 7,036,027 B2 | * | 4/2006 | Kim et al. | ............. 713/300 |
| 2002/0073306 A1 | * | 6/2002 | Aluzzo et al. | ............. 713/1 |
| 2002/0157067 A1 | * | 10/2002 | Yaguchi | ............. 716/1 |
| 2005/0174737 A1 | * | 8/2005 | Meir | ............. 361/697 |
| 2005/0247438 A1 | * | 11/2005 | Leuschner | ............. 165/127 |

* cited by examiner

*Primary Examiner*—Tung S Lau
*Assistant Examiner*—Xiuquin Sun
(74) *Attorney, Agent, or Firm*—Blakely, Sokoloff, Taylor & Zafman LLP

(57) ABSTRACT

Numerous embodiments of a method to allow for adaptive performance margining of processing components on a carrier substrate are described. In one embodiment, the temperature of a processing component disposed on motherboard is measured and determined whether the temperature falls within a performance margining range. The processing speed of the component is then increased or maximized based on the performance margining range.

18 Claims, 4 Drawing Sheets

METHOD FOR ADAPTIVE PERFORMANCE MARGINING WITH THERMAL FEEDBACK

TECHNICAL FIELD

Embodiments of the present invention relate to the field of processing components, and in particular, to processing components disposed on computer motherboards.

BACKGROUND

The processing speed of a computer system is determined by two primary factors, front side bus (FSB) and central processing unit (CPU) speed. Also known as system bus speed, front side bus speed is the speed at which the CPU communicates with memory and other components on the system. Front side bus speeds is determined by a clock setting, while CPU speed is typically determined by a multiplier of that same value. For example, a processor having a listed speed of 1.0 Ghz may use a system bus of 100 Mhz and a multiplier of 10 (10×100 Mhz=1000 Mhz or 1.0 Ghz).

The "listed" processor speed refers to the intended processing speed by the processor's manufacturer. Overclocking is one method of boosting the processing speed of a computer component with a clock rate higher than the clock rate designated by specifications. However, if done arbitrarily, over d locking can be dangerous because of the increased thermal output of the processor and other components on the system. Overclocking may shorten the lifespan of the processor, as it exceeds the temperature envelope it was designed to work within, and in the worst case, the processor may be permanently damaged. Controlling the thermal levels of the integrated circuits and the computer system in general are important for maintaining the stability and longetivity of the components. Typically, a thermal sensing device is built into the CPU that allows the motherboard to measure the temperature of the CPU, and other critical zones in the system, so that system fans of the thermal control systems can try to counter the rising temperature. Such mechanisms may include fan speed, thermal throttling (reduction of system speed), or system shutdown.

One problem with motherboards, particularly retail motherboards for computer systems, is that they are designed without a specific idea of what kind of thermal environment the motherboard will be used in (e.g., size of chassis, number of fans, cooling options, ambient temperature, etc.). Depending on the cooling solutions integrated into the motherboard, the processors may operate at speeds greater than their listed speeds in a safe manner if the thermal conditions are maintained below harmful levels.

BRIEF DESCRIPTION OF THE DRAWINGS

Embodiments of the present invention are illustrated by way of example, and not limitation, in the figures of the accompanying drawings in which.

DETAILED DESCRIPTION

In the following description, numerous specific details are set forth such as examples of specific materials or components in order to provide a thorough understanding of embodiments of the present invention. It will be apparent, however, to one skilled in the art, that these specific details need not be employed to practice embodiments of the present invention. In other instances, well known components or methods have not been described in detail in order to avoid unnecessarily obscuring embodiments of the present invention.

The terms "on," "above," "below," "between," and "adjacent" as used herein refer to a relative position of one layer or element with respect to other layers or elements. As such, a first element disposed on, above or below another element may be directly in contact with the first element or may have one or more intervening elements. Moreover, one element disposed next to or adjacent another element may be directly in contact with the first element or may have one or more intervening elements.

Any reference in the specification to "one embodiment" or "an embodiment" means that a particular feature, structure, or characteristic described in connection with the embodiment is included in at least one embodiment of the claimed subject matter. The appearances of the phrase, "in one embodiment" in various places in the specification are not necessarily all referring to the same embodiment.

Numerous embodiments are described of a carrier substrate that adapts automatically to its thermal environment to allow for dynamic performance margining when thermal or airflow conditions are favorable. The carrier substrate may be any type of semiconductor-based device including but not limited to, a computer chip, printed circuit board (PCB), motherboard, daughterboard, or other computer components disposed on a PCB. In one particular embodiment, the carrier substrate may be a retail motherboard for placement in a chassis of a desktop computer system. In one embodiment, a CPU mounted on a motherboard utilizes thermal feedback as a variable control to allow for adaptive altering of a clock speed of a processing component to maximize performance without sacrificing component reliability. Maximizing the clock speed of a processor is permitted when thermal conditions are favorable (e.g., when a predetermined thermal margin exists, and not necessarily when processor utilization is high), allowing the motherboard to leverage a favorable thermal environment and maximize processor usage.

Figure 1:
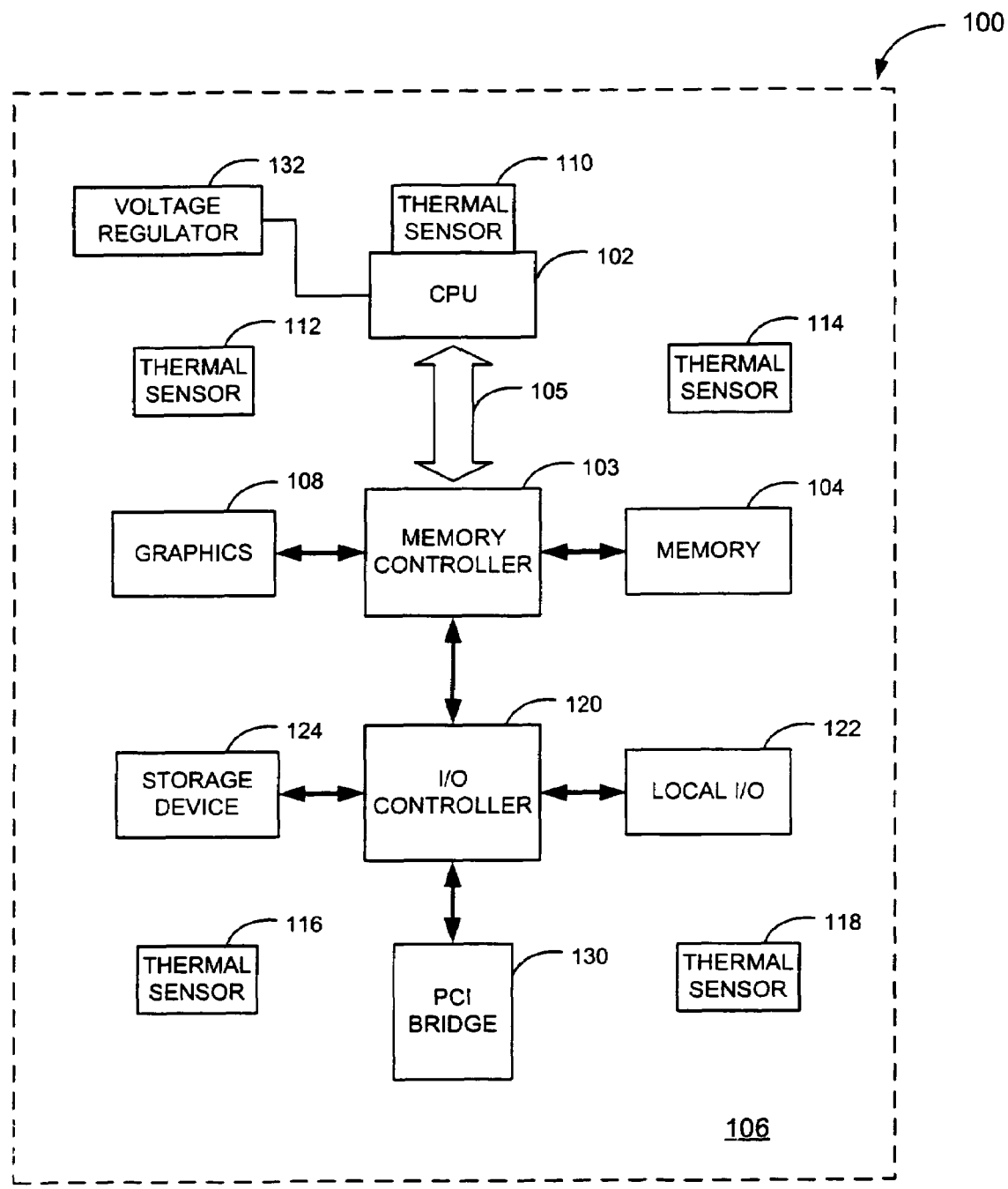
FIG. 1 is a logic diagram of one embodiment of a computer system.

FIG. 1 illustrates a logic diagram of one embodiment of a computer system 100 that supports adaptive performance margining (e.g., increasing a clock speed of a processing component) based on thermal feedback. The computer system 100 includes a main logic board or motherboard 106 with at least one central processing unit (CPU) or processor 102, and one or more memory units 104 such as random access memory (RAM) and read only memory (ROM), coupled to motherboard 106, as well as a graphics processor 108. More than one processor 102 may be part of system 100 (e.g., a dual processor system, or a dual core processor system). In one embodiment, graphics processor 108 and the memory unit 104 reside on separate printed circuit cards that are coupled to the motherboard 106. A voltage regulator 132 is coupled to CPU 102 to convert the power supply voltage into the different levels required by CPU 102. In one embodiment, voltage regulator 132 may be integrated with CPU 102.

A memory controller 103 allows for the interface of memory unit 104 and graphics processor 108 with CPU 104. Memory controller 103, in one embodiment, may be a chipset known as "North Bridge" or "Graphics and Memory Controller Hub." Memory controller 103 also defines the speed at which data can flow between CPU 104, memory unit 104, and graphics processor 108 through bus 105. Bus 105 may also be referred to as front side bus (FSB), processor bus, memory bus or system bus. The speed of bus 105 may be set using a software utility for motherboard 106 or in Basic Input Output System (BIOS) firmware, the software that is programmed into ROM or FLASH of memory unit 104. An input /out (I/O) controller 120 manages the interface of , other components coupled to motherboard 106 such as storage device 116, local I/O 122, and peripheral component interconnect (PCI) 133. I/O controller 120, in one embodiment, may be a chipset known as "South Bridge" or "I/O Controller Hub."

In one embodiment, CPU 102 has a processing speed that is temperature dependent. That is, CPU 102 has a clock rate that changes as a function of its temperature. When the temperature of CPU 102 is relatively cool, the clock rate may be increased by increasing the multiplier for bus 105. In one embodiment, a clock rate for CPU 102 may be increased to a level above the intended or listed rate by its manufacturer (i.e., overclocked), in order to maximize the processing capability of CPU 102 without risk of damage to CPU 102 or related components.

One or more thermal sensors 110, 112, 114, 116, and 118 may also be coupled to motherboard 106 to provide thermal measurements for various components on motherboard 106. One thermal sensor 110, may be dedicated to monitoring the thermal output of CPU 102, while thermal sensors 112, 114, 116, and 118 are spread out over motherboard 106 to monitor specific zones. For example, these zones may include an integrated circuit known to produce temperature conditions which may impact other circuits in a close vicinity of motherboard 106, devices whose function may be affected by higher temperature, or devices known to generated more heat during normal operation. Automatic performance margining through increasing a clock rate of CPU 102 is achieved when a predetermined temperature level is detected. Then, a clock multiplier of bus 105 is altered to increase the performance speed of CPU 102 and overall system.

Instructions to allow for increasing a clock rate for CPU 102 may be stored in the BIOS firmware, a software that is programmed into memory 104. In one embodiment of the present invention, thermal sensors 110, 112, 114, 116, and 118 continuously provide temperature measurements to the system, which utilizes the thermal readings from thermal sensors 110, 112, 114, 116, and 118 to determine whether an increase of CPU clock rate can be safely achieved, leveraging thermal headroom by maximizing the clock rate of CPU 102 when a predetermined temperature level exists. In an alternative embodiment, the interface with thermal sensors 104, 105 may be other types of software utilities or machine-accessible medium known in the art. Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., ROM, RAM, magnetic disk storage media, optical storage media, flash memory devices, etc.), as well as electrical, optical, acoustical or other form of propagated signals (e.g., carrier waves, infrared signals, digital signals, etc.). Although FIG. 1 illustrates a logical relationship of the various components on motherboard 106, in one embodiment, the corresponding hardware components for the components described may be disposed on motherboard 106 as shown.

In one embodiment, adaptive maximizing of the clock rate of CPU 102 and other processing components proceeds according to information and rules stored in the BIOS. The information stored in the BIOS may include processing speed capabilities and/or limitations of various components coupled to motherboard 106, and thermal thresholds for the system (e.g., motherboard 106) and/or processing components (e.g., CPU 102). Rules stored in the BIOS may include the degree of clock rate increase based on the thermal margin to a predetermined limit. For example, an operating temperature for CPU 102 measured at 20° C. below a predetermined threshold may allow for a greater degree of clock rate increase relative to an operating temperature measured at 10° C. below the predetermined limit.

Figure 2:
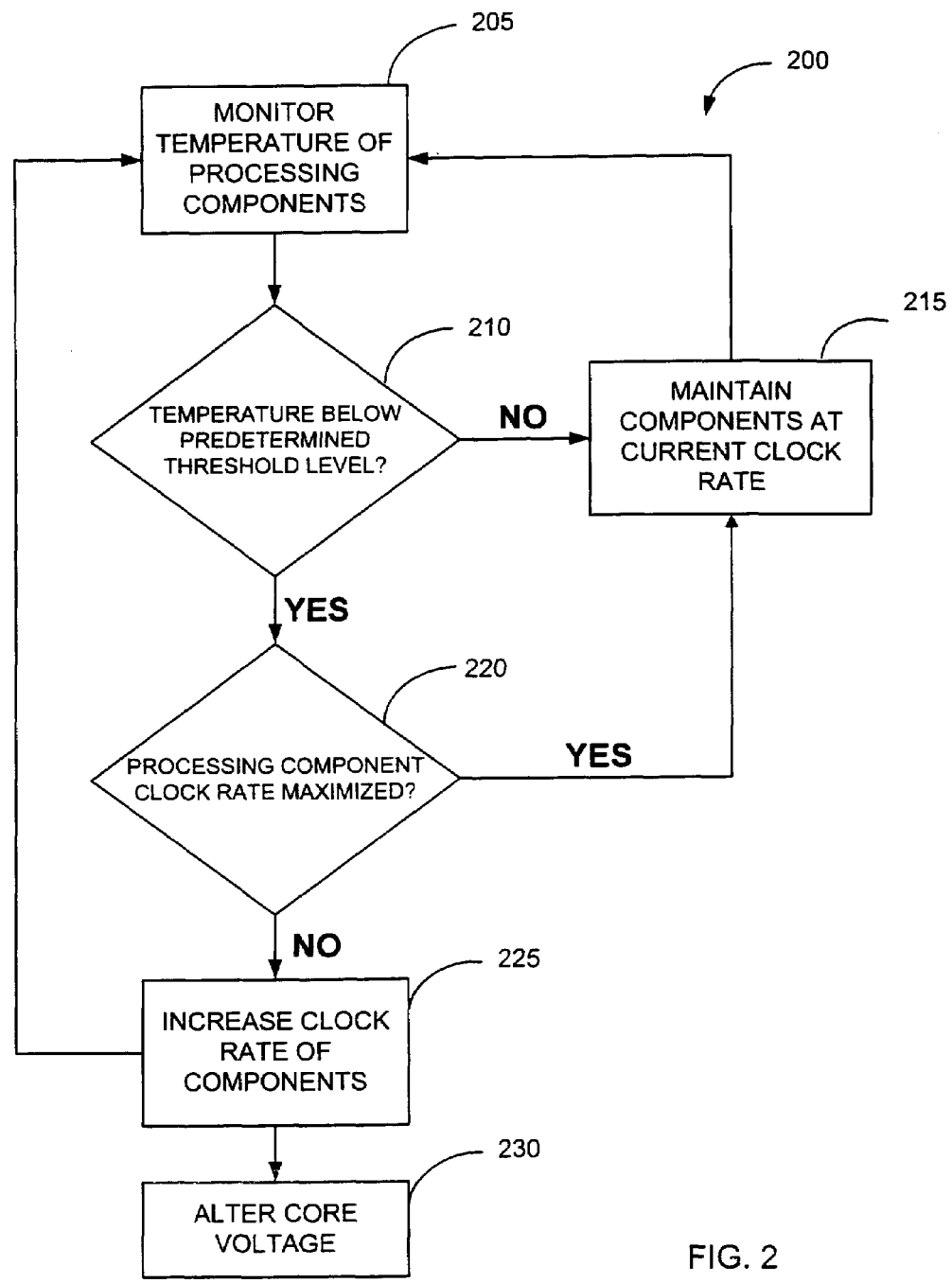
FIG. 2 illustrates a flowchart of one embodiment of an operation to maximize a clock rate of a processor based on thermal conditions.

FIG. 2 illustrates a flowchart of one embodiment of an operation 200 for increasing or maximizing a clock rate for a processing component (e.g., CPU 102) on a motherboard (e.g., 106). A set of performance margining instructions (e.g., a program) may be encoded in a firmware (e.g., BIOS) or a motherboard utility which includes monitoring the temperature readings from various thermal sensors (e.g., sensors 104, 105) disposed on the motherboard, block 205. The thermal sensors may be disposed in a number of places on the motherboard, including being directly coupled to processing components, as well as measuring the overall system temperature. The performance margining program compares the measured temperatures of the motherboard components to a predetermined threshold level to determine whether the measured temperatures are above or below the threshold level, block 210. If the measured temperature is at or above the threshold level, the components are maintained at the current processing speeds and no performance margining operation occurs, block 215. In one embodiment, the threshold temperature may be about 55° C. for the CPU and about 22° C. or about room temperature for the overall system (i.e., motherboard).

If the measured temperatures are below the threshold temperature, or within predetermined range, the processing component is checked to see if it already operating under increased on maximized conditions, block 220. If so, the processing speed is not altered, block 215. If the processor speed is not maximized, performance margining may be enacted, for example, by increasing a clock rate of CPU 102, block 225. The degree of clock rate increase may be determined by the temperature margin below the threshold temperature. That is, the greater the margin, the greater the degree of clock rate change. In an alternative embodiment, in which the thermal margin is large, the core voltage of CPU 102 may be altered in order to increase system stability in conjunction with the relatively large degree of clock rate change, block 230. For example, the performance margining program may also include instructions to increase or decrease the CPU core voltage (e.g., with voltage regulator 132) in accordance with a pre-defined algorithm. This would allow for the computer system to leverage extremely favorable conditions and maximize the clock rate of the CPU, and in one embodiment, to levels above its intended rates (i.e., overclocking).

The following examples provide relative comparisons of the degree performance margining that may be achieved based on a particular thermal environment for processing components disposed on a motherboard. In a first configuration, a motherboard is disposed within a chassis (e.g., housing, tower) with a single fan, that of the power supply, in addition to a fan for the CPU and a fan for the graphics processor. As a result, the motherboard produces a total airflow of about 100 linear feet per minute (LFM). LFM is a forced air cooling rating that represents the direction of air flow and related directly to heat transfer. In one embodiment, the CPU, under idle conditions, has a thermal limit of about 50° C. This relatively standard cooling solution does not allow for the CPU and motherboard temperatures to fall much below the thermal limit of about 50° C., leaving little or no chance for increasing a clock rate of the CPU.

In a second configuration, the motherboard is disposed within a high performance chassis that includes three fans, a power supply fan, a front fan, and a top fan. These three fans, in conjunction with the CPU and graphics processor fans, produces a total of 300 LFMs of airflow. Critical components run significantly cooler, leaving considerable headroom for increasing a clock rate without significantly compromising stability or reliability.

In a third configuration, the motherboard is disposed within a high performance chassis that includes a water cooling solution or similar type of liquid cooling system. Water cooling solutions are known in the art, accordingly, a detailed description is not provided herein. Employing this type of aggressive cooling system may maintain the temperature of CPU 102 and motherboard (system) below about 20° C., resulting in thermal margins of about 30° C. For example, CPU 102 may have a core voltage of about 1.5 V and operating at a processing speed of about 2.2 GHz which may be increased to a processing speed of about 3.0 GHz because of the relatively large thermal margin. As discussed above, the CPU core voltage, in one embodiment, may also be altered. For example the CPU core voltage may be increased to about 1.55V, while still allowing the CPU temperature to stay below 20° C. It should be noted that increasing the CPU core voltage may have a significant impact on thermal conditions, more so than increasing a processor clock speed. Accordingly, increasing the CPU core voltage may be suitable only when thermal margins are large, and the increase in one embodiment, is not more than about 15% above the given voltage level. In motherboard configurations that employ aggressive cooling solutions such as water cooling for the CPU 102 (as well as the other configurations described herein), the thermal reference for enacting a clock rate increase, in one embodiment, may take into account the overall system temperature, and not the CPU temperature as a single reference point.

Figure 3:
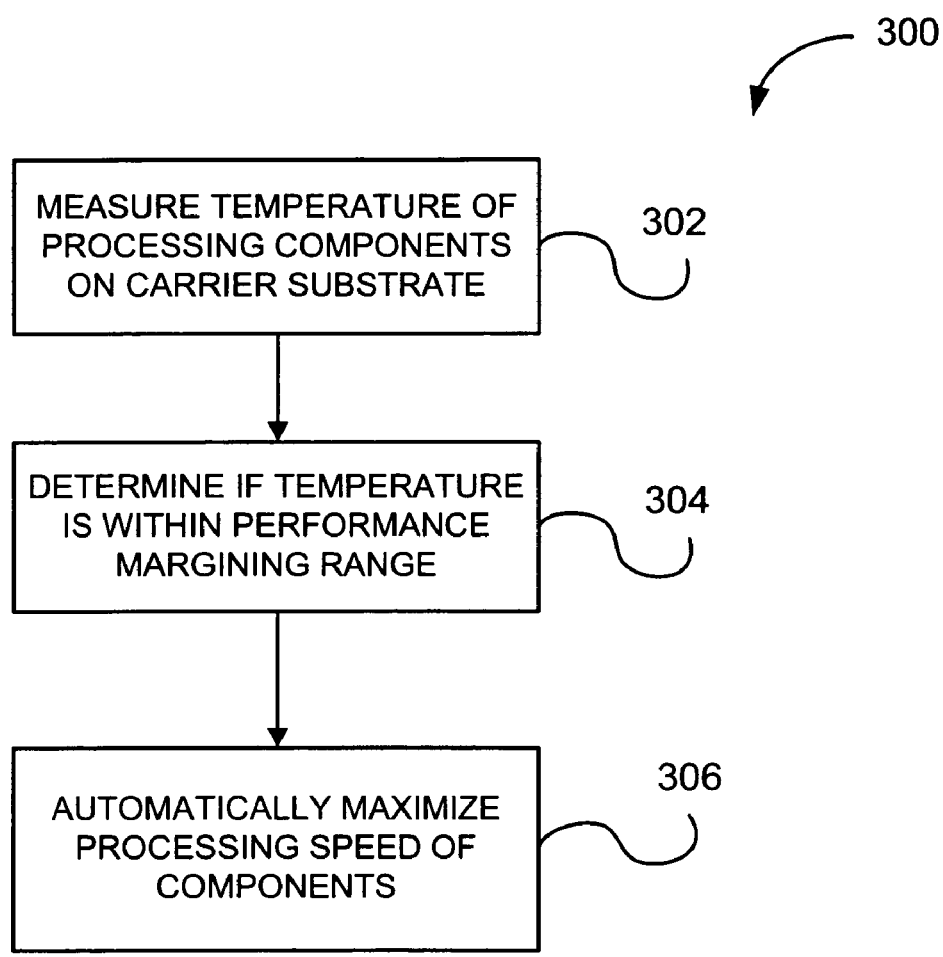
FIG. 3 illustrates a block diagram of one method maximizing a processor clock rate.

FIG. 3 illustrates a block diagram 300 of one method to increase or maximize a processor speed automatically based on thermal conditions of the processor and/or carrier substrate (e.g., motherboard 106). The processing components on a motherboard (e.g., CPU 102, graphics processor 108) are measured with temperature sensors (e.g., thermal sensors 110, 112, 114, 116, 118) disposed throughout the motherboard, block 302. The measured temperatures are compared against a threshold level to determine whether they fall within a performance margining range, block 304. In one embodiment, the threshold level may be the maximum allowable temperature for the safe operation of the processing component. The performance margining range may be a temperature range below the threshold level that allows for the increase in the clock rate of the processing component, and may be predetermined based on the type of processor, listed operating temperatures, and listed processing speed. If the measured temperatures fall within the performance margining range, the processing speed of the component is automatically maximized or increased, block 306. In one embodiment, the processing speed may be increased by changing a clock multiplier for a bus coupled to the processing component. In another embodiment, maximizing the clock rate result in the processing component operating at speed greater than its listed speed (i.e., overclocking).

Figure 4:
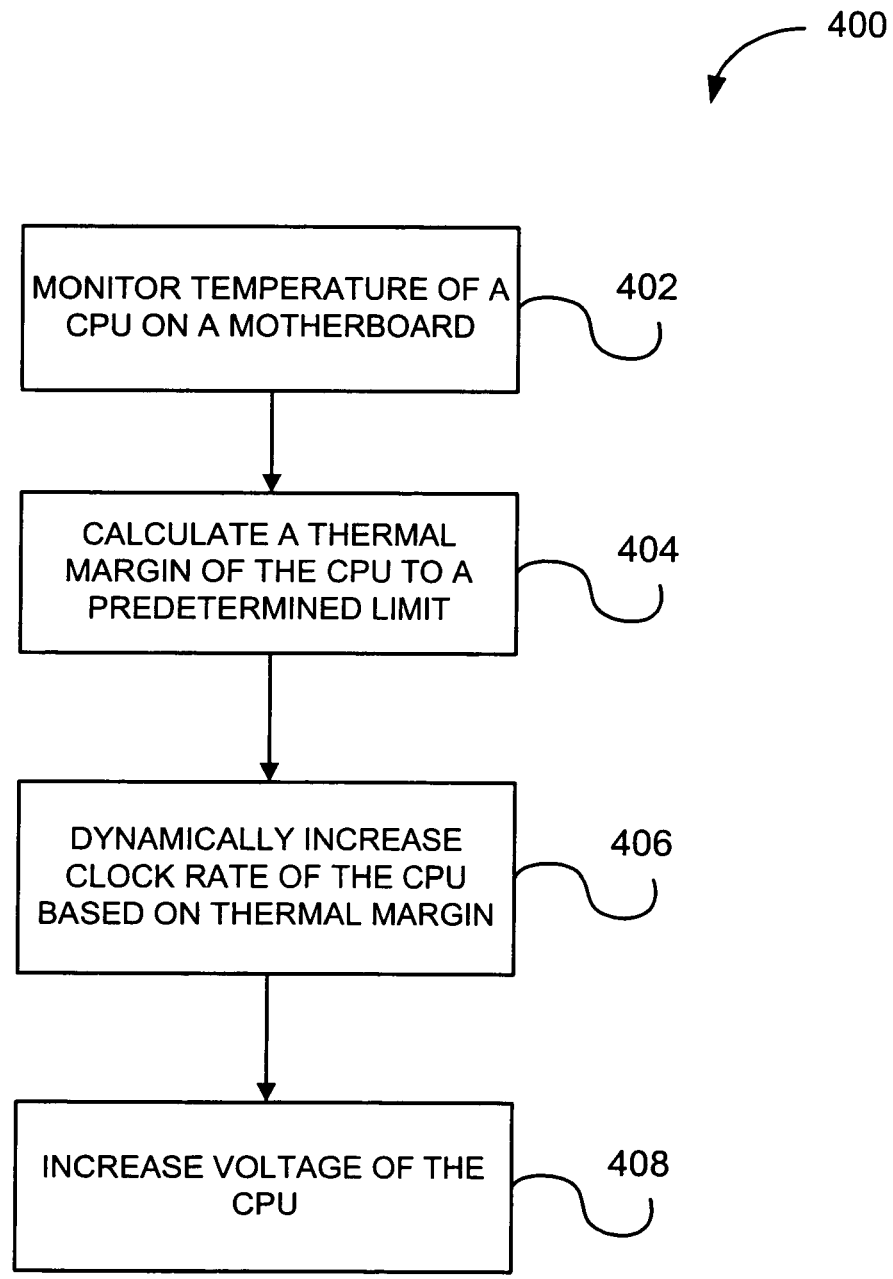
FIG. 4 illustrates a block diagram of another method to maximize a processor clock rate.

FIG. 4 illustrates block diagram 400, of an alternative method to increase or maximize a processor speed automatically based on thermal conditions. The temperature of a CPU (e.g., CPU 102) disposed on a motherboard, block 402. In one embodiment, the CPU has a clock rate that may be temperature dependent; that is, the lower the temperature of the CPU, the higher the clock rate may be. A thermal margin for the CPU is calculated, based on the temperature of the CPU relative to a predetermined limit, block 404. In one embodiment, the predetermined limit may be the upper and/or lower listed operating temperatures by the CPU manufacturer. If a thermal margin exists, the clock rate of the CPU is increased adaptively in order to increase a processing speed of the CPU, block 406. A thermal margin exists if the temperature of the CPU is below the listed operating temperature. A thermal margin may also exist if the CPU temperature is between the upper and lower listed operating temperatures. In one embodiment, the greater the thermal margin, the greater the amount of clock rate increase, and in some cases, to levels above the listed clock rates (i.e., overclocking). Alternatively, if no thermal margin exists, no changes are made to the clock rate of the CPU. A voltage of the CPU may also be increased in conjunction with an increase in clock rate, block 408. When thermal margin is very high and the clock rate is increased, a small change in CPU voltage may be used to help stabilize the system. In one embodiment, the temperature of the CPU is constantly monitored so that the clock rate may be reduced if the increased clock rate causes the CPU temperature to reach the predetermined limit.

In the foregoing specification, the invention has been described with reference to specific exemplary embodiments thereof. It will, however, be evident that various modifications and changes may be made thereto without departing from the broader spirit and scope of embodiments of the invention as set forth in the appended claims. The specification and figures are, accordingly, to be regarded in an illustrative rather than a restrictive sense.

What is claimed is:

1. A method, comprising:

measuring a temperature of a processing component on a motherboard and a temperature of one or more zones of the motherboard;

determining if the temperature of the processing component and the one or more zones of the motherboard is within a performance margining range of the processing component and the one or more zones of the motherboard;

comparing the temperature of the processing component to a predetermined temperature limit for the processing component;

comparing the temperature of the one or more zones of the motherboard to a predetermined temperature limit for a respective zone of the motherboard;

comparing the temperature of a component of a zone of the motherboard to a predetermined temperature limit for the component of the zone of the motherboard;

maximizing a processing speed of the processing component automatically based on the performance margining range; and maintaining the processing speed of the processing component at the current processing speed when the measured temperature of the processing component is at least above the predetermined temperature limit of the processing component, the temperature of the one or more zones of the motherboard is at least above the predetermined temperature limit of the respective zone of the motherboard, the temperature of the component of the zone of the motherboard is at least above the predetermined temperature limit of the component of the zone of the motherboard.

2. The method of claim 1, wherein measuring comprises disposing a thermal sensor on the motherboard.

3. The method of claim 2, wherein the processing component comprises a CPU, and wherein disposing further comprises coupling the thermal sensor to the CPU.

4. The method of claim 3, wherein measuring further comprises:
monitoring an overall temperature of the motherboard; and
determining if the system temperature is within the performance margining range.

5. The method of claim 1, wherein maximizing further comprises increasing a clock multiplier of a bus coupled to the processing component.

6. The method of claim 5, wherein maximizing further comprises setting the clock multiplier to generate a clock rate for the processing component to a level above a listed clock rate.

7. The method of claim 6, wherein maximizing further comprises altering a voltage for the processing component.

8. A method, comprising:
monitoring a temperature of a CPU disposed on a motherboard and a temperature of one or more zones of the motherboard, the CPU having a temperature dependent clock rate;
calculating a thermal margin of the CPU based on the temperature of the CPU and the temperature of the one or more zones of the motherboard to a predetermined limit;
comparing the temperature of the one or more zones of the motherboard to a predetermined temperature limit for a respective zone of the motherboard;
comparing the temperature of a component of a zone of the motherboard to a predetermined temperature limit for the component of the zone of the motherboard;
increasing a clock rate of the CPU automatically based on the thermal margin by setting the clock rate to a level above a listed clock rate; and
maintaining the clock rate of the CPU at the current clock rate when the measured temperature of the CPU is at least above the thermal margin of the CPU, the temperature of the one or more zones of the motherboard is at least above the predetermined temperature limit for the respective zone of the motherboard, the temperature of the component of the zone of the motherboard is at least above the predetermined temperature limit of the component of the zone of the motherboard.

9. The method of claim 8, further comprising altering a CPU core voltage automatically based on the increasing of the clock rate.

10. The method of claim 9, wherein altering further comprises controlling the CPU core voltage with a voltage regulator coupled to the CPU.

11. The method of claim 8, wherein increasing further comprises changing a clock multiplier of a bus coupled to the CPU.

12. The method of claim 8, further comprising decreasing a clock rate of the CPU based on the thermal margin.

13. The method of claim 8, wherein instructions for the monitoring, calculating, and increasing are stored in a BIOS for the motherboard.

14. The method of claim 8, wherein instructions for the monitoring, calculating, and increasing are stored in a software utility for the motherboard.

15. An article of manufacture, comprising:
a machine-accessible medium including data that, when accessed by a machine, cause the machine to perform operations comprising,
measuring a temperature of a processing component on a motherboard and a temperature of one or more zones of the motherboard;
determining if the temperature of the processing component and of one or more zones of the motherboard is within a performance margining range of the processing component and the motherboard;
comparing the temperature of the processing component to a predetermined temperature limit for the processing component;
comparing the temperature of the one or more zones of the motherboard to a predetermined temperature limit for a respective zone of the motherboard;
comparing the temperature of a component of a zone of the motherboard to a predetermined temperature limit for the component of the zone of the motherboard;
maximizing a processing speed of the processing component automatically based on the performance margining range; and
maintaining the processing speed of the processing component at the current processing speed when the measured temperature of the processing component is at least above the predetermined temperature limit of the processing component, the temperature of the one or more zones of the motherboard is at least above the predetermined temperature limit of the respective zone of the motherboard, the temperature of the component of the zone of the motherboard is at least above the predetermined temperature limit of the component of the zone of the motherboard.

16. The article of manufacture of claim 15, wherein the machine-accessible medium further includes data that cause the machine to perform operations comprising increasing a clock multiplier for a bus coupled to the processing component.

17. The article of manufacture of claim 16, wherein the machine-accessible medium further includes data that cause the machine to perform operations comprising setting the clock multiplier to generate a clock rate for the processing component to a level above a listed clock rate.

18. The article of manufacture of claim 15, wherein the machine-accessible medium further includes data that cause the machine to perform operations comprising altering a voltage processing component.

* * * * *